June 10, 1958　　　A. SCHNEIDER　　　2,838,583
SEPARATION OF MONOALKYLBENZENES BY EXTRACTING ITS
POLYALKYL ISOMERS WITH AN AlCl₃-AROMATIC
HYDROCARBON COMPLEX
Filed Oct. 8, 1953
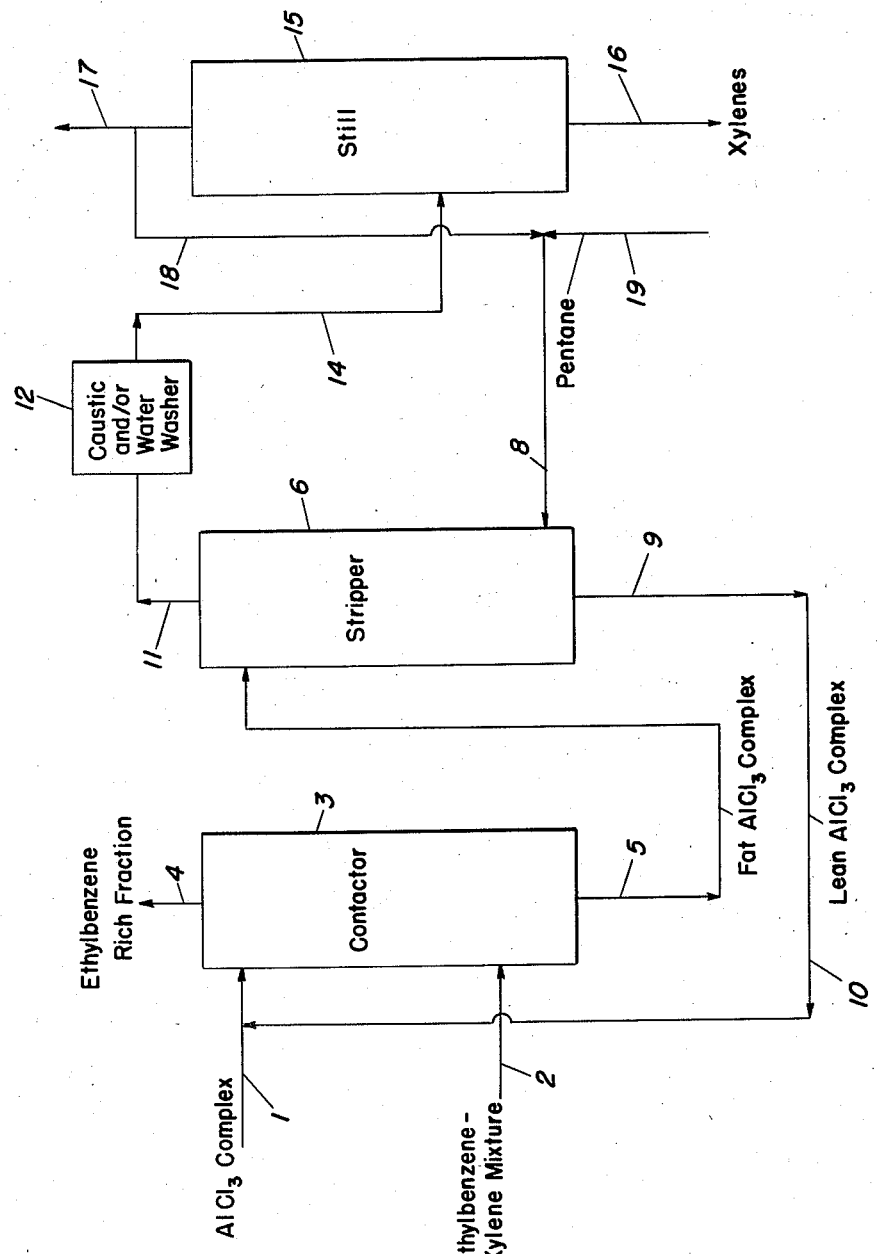
INVENTOR.
ABRAHAM SCHNEIDER
ATTORNEY

¹

2,838,583

SEPARATION OF MONOALKYLBENZENES BY EXTRACTING ITS POLYALKYL ISOMERS WITH AN AlCl₃-AROMATIC HYDROCARBON COMPLEX

Abraham Schneider, Philadelphia, Pa., assignor to Sun Oil Company, Philadelphia, Pa., a corporation of New Jersey Application October 8, 1953, Serial No. 384,837

7 Claims. (Cl. 260—674)

This invention relates to a process for separating a monoalkyl benzene from an admixture thereof with its polyalkyl benzene isomers.

The separation of alkyl benzene isomers has presented an important and difficult problem. For example, the similarity in physical properties makes difficult the separation of one or more components from an admixture of xylenes and ethylbenzene. Various methods of separation, however, have heretofore been described, and generally involve chemical reactions whereby one or more isomers are converted to higher boiling compounds, or physical separation such as by chilling the mixture to a relatively low temperature to crystallize one or more isomers which are then separated. The separation of individual isomers, or concentrates thereof, is made much easier by a preliminary separation whereby one isomer is substantially completely removed from the mixture. For example, the preparation of an ethylbenzene free xylene mixture would greatly simplify subsequent separation of the individual xylene isomer and makes possible, after subsequent separation of an isomer such as paraxylene, the isomerization of the remaining isomers to form additional quantities of the separated isomer, so that the fraction can be recycled to extinction without build-up of ethylbenzene concentration. Also, the importance of monoalkyl benzenes substantially free of their polyalkyl isomers is well established. For example, ethylbenzene is important because of the ease with which it may be converted to styrene from which a variety of resins and plastics can be prepared. However, an economically feasible process for such preparations has not heretofore been described.

An object of the invention is to provide a process for the separation of a mixture of isomeric polyalkyl benzenes from their monoalkyl benzene isomer. A further object is to provide a process for separating alkyl benzenes into two fractions, one fraction being substantially free from monoalkyl benzene. Another object is to provide a process for concentrating a monoalkyl benzene hydrocarbon contained in an admixture of its polyalkyl benzene isomers. A specific object of the invention is to provide a process for the preparation of a xylene mixture free of ethylbenzene. Other objects will be apparent from the following specification.

It has now been found that by contacting a mixture containing a monoalkyl benzene and one or more of its polyalkyl benzene isomers with an aluminum chloride complex, formed as hereinafter described, the monoalkyl benzene is not dissolved in the complex whereas the isomers thereof are dissolved to a substantial extent. Thus, by contacting the isomeric mixture with the aluminum chloride complex and separating the organic layer from the complex layer, polyalkyl benzenes dissolved in the complex are free of their monoalkyl benzene isomer. The dissolved polyalkyl benzenes are extracted from the complex with a paraffinic or naphthenic hydrocarbon. On subsequent separation of the paraffinic or naphthenic hydrocarbon extractant, there is obtained a mixture of polyalkyl benzenes in substantially the same proportion as contained in the original mixture.

For convenience, the process of the present invention is described in terms of separating ethylbenzene from an admixture thereof with xylenes, but the scope of the invention is limited only as hereinafter indicated.

In a specific embodiment of the invention, an aluminum chloride complex is formed by contacting aluminum chloride with a mixture of o-xylene, m-xylene, p-xylene and ethylbenzene, the concentrations of the mixture components advantageously being about the same as the mixture from which ethylbenzene is to be separated. The organic layer is separated from the complex layer such as by decanting. The aluminum chloride complex is then extracted with a hydrocarbon such as pentane. The resulting liquid lean aluminum chloride-aromatic hydrocarbon complex is the complex employed for separating ethylbenzene in the present process. In operating the process, the so-prepared lean aluminum chloride complex is contacted with a mixture of xylenes and ethylbenzene from which a xylene fraction free of ethylbenzene is to be prepared. As described above, xylenes are dissolved in the complex whereas ethylbenzene remains in the organic phase. The organic phase is recovered and contains all of the ethylbenzene, and thus forms a concentrate of ethylbenzene in xylene. The fat aluminum chloride complex, i. e., the complex containing extractable aromatic hydrocarbons, is extracted with an extractant preferably having a boiling point different from the boiling point of the dissolved xylenes, such as pentane, and the extracted aromatics separated from the extractant by distillation to form an ethylbenzene free mixture of xylenes. The lean aluminum chloride complex from the extraction step is again contacted with feed stock and the cycle repeated.

As described in the above specific embodiment of the invention, the aluminum chloride complex is advantageously prepared by contacting aluminum chloride with a mixture of the same aromatics to be employed in the process, and preferably the same mixture to be employed in the process is used to prepare the complex. By preparing the complex in this manner, the aromatics extracted from the fat complex in the first cycle are in substantially the same proportion as in the feed mixture. However, the concentration of components need not be the same in each instance, it being only necessary that at least one polyalkyl isomer be present in the formation of the complex. In this instance, the aromatics extracted from the fat complex in the first cycle of the process may vary in proportion as compared to their proportion in the feed mixture. After the first cycle this variation in proportion of the extracted aromatics vanishes. In the preparation of the complex, hydrogen chloride may be added to the mixture to assist in the formation thereof if desired. In the preparation of the complex, it is preferred to employ a weight ratio of alkyl benzenes to aluminum chloride within the range of 2:1 to 5:1.

Attention is now directed to the accompanying flow diagram which illustrates an embodiment of the process. Aluminum chloride complex, formed as above described, and an admixture of xylenes and ethylbenzene are introduced through lines 1 and 2, respectively, into contactor 3, wherein they are contacted in countercurrent relationship. Since ethylbenzene is not dissolved in the complex, an ethylbenzene rich fraction is removed from contactor 3 through line 4. All or a portion of this fraction can be retreated in the process, if desired, within the concentration limits for ethylbenzene as hereinafter given. The fat aluminum chloride complex, containing dissolved xylenes, it removed from contactor 3 through line 5 and passes into the top of stripper 6. Pentane, used to illustrate extractants that can be employed, is introduced near the bottom of stripper 6 through line 8 and contacts, in countercurrent relationship, the fat aluminum chloride complex introduced through line 5. In stripper 6, dissolved xylenes are removed from the aluminum chloride complex and the regenerated lean complex passes from stripper 6 through line 9 and is recycled through lines 10 and 1. Xylenes free from ethylbenzene are removed from stripper 6 through line 11 and advantageously are subjected to a caustic or water washing operation 12 to remove any dissolved aluminum chloride or aluminum chloride complex. The xylenes then pass through line 14 into still 15 wherein xylenes free of ethylbenzene are removed through line 16 and pentane through line 17. Advantageously the pentane is recycled to the process through lines 18 and 8. Fresh pentane may be introduced when necessary through line 19.

In accordance with the process of the invention, ethylbenzene can be separated from any xylene or mixture of xylenes. The process is also applicable to the separation of other monoalkyl benzenes from admixtures thereof with their polyalkyl isomers. For example, n-propyl benzene can be separated from 1-methyl-3-ethylbenzene, 1-methyl-2-ethylbenzene, mesitylene, or any mixture of such isomers of n-propyl benzene. The higher monoalkyl benzenes such as n-butyl, isobutyl, n-amyl, and isoamyl benzenes can also be separated from their isomers in like manner. However, it is preferred to employ monoalkyl benzenes having not more than 3 carbon atoms in the alkyl group since larger side chains tend to cleave and disproportionate in the process. Such undesired side reactions, however, can be held to a minimum by employing relatively low temperatures as hereinafter described.

The composition of the aromatic feed stock can vary substantially. Best results are obtained by relating the composition of the feed stock to the result desired. For example, where the preparation of a xylene fraction free of ethylbenzene is desired, the feed stock preferably contains not more than about 40% by volume ethylbenzene. Usually the feed will contain at least 2% by volume of ethylbenzene, but feeds containing smaller amounts, say about 0.5% by volume are operable and give good results in the preparation of xylene fractions free of ethylbenzene. Where the separation of substantially pure ethylbenzene is desired, the use of feeds having larger quantities of ethylbenzene, say from about 40% to 90% or more by volume gives good results. Paraffins and naphthenes tend to prevent the separation, but can be present in the feed in small amounts without deleteriously affecting the process. The concentration of such saturates in the feed in all instances would be below about 15% by volume. Such saturated hydrocarbons remain in the organic phase in the process. Olefins are preferably substantially absent, and should not be present in the feed in concentrations above about 5% by volume. If present, olefins usually dissolve in the complex, and may be polymerized to high molecular weight materials. Crude xylene fractions produced in petroleum operations, such as the catalytic reforming of naphtha, or during the coking of coal, have substantial quantities of ethylbenzene, usually from about 8 to 25% by volume, and are suitable for use in the process.

The amount of aluminum chloride complex to employ can be varied substantially and good results obtained. The actual quantity to employ is advantageously varied in accordance with the composition of the feed. Where a relatively small amount of ethylbenzene is present in the feed a relatively large amount of the complex is employed in order to dissolve the large quantity of xylenes present. When the feed contains a relatively large amount of ethylbenzene, the quantity of aluminum chloride required is relatively small. In general, the weight ratio of alkyl benzenes to aluminum chloride complex will be within the range of 1:0.1 to 1:2.5.

Normal pentane is the preferred extractant to employ but other paraffinic and/or naphthenic hydrocarbons can be used. In all cases, it is preferred to employ an extractant having a boiling point sufficiently removed from the boiling point of the alkyl benzenes so that ready separation can be obtained by distillation. As examples of extractants may be mentioned isopentane, any of the hexanes, any of the heptanes, any of the octanes, mixtures thereof, and naphthenes such as cyclopentane, cyclohexane, methylcyclopentane, methylcyclohexane, dimethylcyclohexane and mixtures thereof. Mixtures of paraffinic and naphthenic hydrocarbons such as occur in straight run naphtha, kerosene, and the like can be employed, it being remembered that the boiling point should be sufficiently removed from the polyalkyl benzenes to afford easy separation thereof. The quantity of extractant to employ is advantageously such that the weight ratio of extractant to fat aluminum chloride complex is from 1:1 to 10:1.

The temperature to employ in contacting the alkyl benzene feed with aluminum chloride complex should be within the range of from $-10°$ C. to $100°$ C., and preferably is $50°$ C. Pressure is not a critical variable, and atmospheric pressure is preferred, but super or sub-atmospheric pressures can be employed if desired. The time of contacting feed and complex can be varied substantially, but excessively long contacting periods are undesirable since undesired reactions such as disproportionation or cleavage may occur. In general, in batch operation, a contact time of from 5 to 60 minutes gives good results, as does an equivalent time when continuous operation is employed.

The following example illustrates an embodiment of the invention for the preparation of an ethylbenzene free mixture of xylenes. In the example, "feed stock" refers to an admixture of hydrocarbons consisting of, in parts by volume, o-xylene=12.1 parts (3.9 vol. percent); m-xylene=184 parts (59.4 vol. percent); p-xylene=75.7 parts (24.4 vol. percent); ethylbenzene=30.1 parts (9.7 vol. percent) and saturated hydrocarbons=8.1 parts (2.6 vol. percent).

An $AlCl_3$ complex was prepared by agitating together for 1 hour, at a temperature of from $55°$ C. to $60°$ C., 7.8 parts by weight of feed stock and 1 part by weight $AlCl_3$. To assist in forming the complex, the admixture was initially saturated with hydrogen chloride. The organic layer was separated from the complex and the complex extracted with 3.68 parts by weight n-pentane. The n-pentane and extracted material were separated from each other by distillation. There were recovered, in parts by weight, 5.84 parts organic layer, 1.3 parts pentane extracted material, and 1.75 parts lean $AlCl_3$ complex. The recovered organic layer and pentane extracted material had the following compositions (expressed as volume percent):

|  | Organic layer | Pentane extract |
|---|---|---|
| o-xylene | 6 | 4 |
| m-xylene | 60 | 61 |
| p-xylene | 27 | 26 |
| ethylbenzene | 7 | 9 |

It will be noted that these compositions are substantially the same and are also substantially the same as the feed stock, especially after making allowance for the saturated hydrocarbons in the feed stock. Thus, no selectivity in adsorption was observed in the preparation of the $AlCl_3$ complex.

The lean $AlCl_3$ complex prepared as above described was contacted with feed stock, 1.75 and 3.7 parts by weight of lean $AlCl_3$ complex and feed stock, respectively, being used. The contacting was for 30 minutes at a temperature of $21°$ C. The organic layer was separated from the complex and the complex extracted with 3.68 parts by weight n-pentane. The n-pentane and extracted material were separated by distillation. There were recovered, in parts by weight, 2.65 parts organic layer, 1.1 parts pentane extracted material, and 1.75 parts lean AlCl₃ complex.

The recovered organic layer and pentane extracted material had the following compositions (expressed as volume percent):

|  | Organic layer | Pentane extract |
|---|---|---|
| o-xylene | 3 | 5 |
| m-xylene | 58 | 66 |
| p-xylene | 25 | 26 |
| ethylbenzene | 7 | 0 |

It will be noted that the pentane extract was free of ethylbenzene, and that the distribution of the remaining aromatic constituents of the feed stock did not appreciably change.

The cycle was again repeated using the lean AlCl₃ complex formed in the preceding cycle. 2.5 parts of feed stock and 1.75 parts of lean AlCl₃ were employed. Contacting was for 1 hour at 21° C. There were recovered, in parts by weight, 1.6 parts organic layer, 0.88 part pentane extract, and 1.79 parts lean AlCl₃ complex. The recovered organic layer and pentane extract had the following compositions (expressed as volume percent):

|  | Organic layer | Pentane extract |
|---|---|---|
| o-xylene | 3 | 4 |
| m-xylene | 68 | 71 |
| p-xylene | 20 | 21 |
| ethylbenzene | 4 | 0 |
| toluene | 4 | 4 |

Again, ethylbenzene was absent from the pentane extract. The small amount of toluene formed is believed due to the relatively long contacting time of 1 hour used in this cycle.

The example illustrates the preparation of a mixture of xylenes free of ethylbenzene, and it may be noted that a concentrate of ethylbenzene was not produced. This was primarily due to the relatively long contacting times employed in contacting the feed and aluminum chloride complex, which resulted in converting a portion of the ethylbenzene to other hydrocarbons. For the preparation of an ethylbenzene concentrate, or substantially pure ethylbenzene, a relatively short contact time, from about 5 to 20 minutes, gives good results. The use of relatively low temperatures during the aluminum chloride complex contacting, say from about —10° C. to 15° C., also assists in preventing undesired side reactions and hence enhances the preparation of ethylbenzene concentrates in accordance with the present process.

The ethylbenzene free mixture of xylenes prepared in the above example can be employed as the feed stock in processes for the separation of xylenes such as described in United States Patent No. 2,648,713, or for the preparation of mixtures of dibasic acids by oxidation, and the like.

When other isomeric mixtures containing a monoalkyl benzene and at least one polyalkyl benzene are employed in the process of the invention, substantially equivalent results are obtained as described for mixtures of ethylbenzene and xylenes.

As above described, the process of the invention can be employed to give substantially pure ethylbenzene. In this operation, it is preferred to supply a feed having an ethylbenzene content above 40% by volume, and preferably above 80% by volume, and to employ a sufficient quantity of aluminum chloride complex to dissolve substantially all of the xylenes present. With such operation, substantially pure ethylbenzene is obtained. If desired, a suitable feed stock can be prepared from a xylene mixture containing a relatively low ethylbenzene content by recycling the organic layer from the aluminum chloride complex contacting to the process to thereby increase the ethylbenzene concentration in the organic layer of the next cycle.

The invention claimed is:

1. Process for separating a monoalkyl benzene having from 2 to 5 carbon atoms in the monoalkyl group from an admixture consisting essentially of said monoalkyl benzene and a polyalkyl benzene which is an isomer of said monoalkyl benzene which comprises contacting, at a temperature of from —10° C. to 100° C., said admixture with a liquid aluminum chloride-aromatic hydrocarbon complex to dissolve at least a portion of said polyalkyl benzene in said complex, and separating undissolved hydrocarbons containing substantially all of the monoalkyl benzene originally present in the mixture from the fat complex, wherein said liquid aluminum chloride-aromatic hydrocarbon complex is prepared by contacting aluminum chloride with said admixture of monoalkyl benzene and polyalkyl benzene and extracting the resulting complex with a saturated hydrocarbon.

2. Process of preparing a mixture of polyalkyl benzene isomers free of their monoalkyl benzene isomer which comprises contacting, at a temperature of from —10° C. to 100° C., a mixture consisting essentially of isomeric polyalkyl benzenes and their monoalkyl benzene isomer having from 2 to 3 carbon atoms in the monoalkyl group with a lean aluminum chloride complex, obtained as hereinafter recited, so that at least a portion of said polyalkyl benzenes are dissolved in said complex, separating the so-formed fat aluminum chloride complex from undissolved hydrocarbons containing substantially all the monoalkyl benzene originally present in the mixture, extracting the fat aluminum chloride complex with a saturated hydrocarbon extractant to obtain a lean aluminum chloride complex, supplying the so-obtained lean aluminum chloride complex to above first-mentioned contacting step, and separating a mixture of polyalkyl benzenes free of their monoalkyl benzene isomer from the saturated hydrocarbon extractant.

3. Process according to claim 2 wherein said mixture of polyalkyl benzene isomers is a mixture of xylenes and said monoalkyl benzene is ethylbenzene.

4. Process according to claim 2 wherein said monoalkyl benzene is n-propylbenzene and said polyalkyl benzenes are polyalkyl benzene isomers of the n-propylbenzene.

5. Process of preparing a mixture of xylenes free of ethylbenzene which comprises contacting at a temperature of from —10° C. to 100° C., a mixture consisting essentially of xylenes and ethylbenzene with a lean aluminum chloride complex, obtained as hereinafter recited, the weight ratio of xylenes and ethylbenzene to said complex being from 1:0.1 to 1:2.5, so that at least a portion of the xylenes are dissolved in said complex, separating the so-formed fat aluminum chloride complex from undissolved hydrocarbons containing substantially all the ethyl benzene originally present in the mixture, extracting the fat aluminum chloride complex with a saturated hydrocarbon extractant to obtain a lean aluminum chloride complex, supplying the so-obtained lean aluminum chloride complex to the above first-mentioned contacting step, and separating a mixture of xylenes free of ethylbenzene from the hydrocarbon extractant.

6. Process according to claim 5 wherein said saturated hydrocarbon extractant is n-pentane.

7. Process for separating ethylbenzene from an admixture consisting essentially of ethylbenzene and xylenes which comprise contacting, at a temperature of from —10° C. to 100° C., said admixture with a lean aluminum chloride complex, obtained as hereinafter recited, so that substantially all of the xylenes are dissolved in the complex and substantially all of the ethylbenzene remains undissolved, separating substantially pure ethylbenzene from the so-formed fat aluminum chloride complex, extracting the fat aluminum chloride complex with a saturated hydrocarbon, and supplying the so-obtained lean aluminum chloride complex to the above first-mentioned step.

References Cited in the file of this patent

UNITED STATES PATENTS

| | | |
|---|---|---|
| 2,458,777 | Hepp et al. | Jan. 11, 1949 |
| 2,481,843 | Holt et al. | Sept. 13, 1949 |
| 2,638,441 | Nixon et al. | May 12, 1953 |

FOREIGN PATENTS

| | | |
|---|---|---|
| 519,021 | Belgium | Apr. 30, 1953 |